R. A. FESSENDEN.
SUBMARINE SIGNALING.
APPLICATION FILED MAR. 29, 1917.
1,394,482.
Patented Oct. 18, 1921.
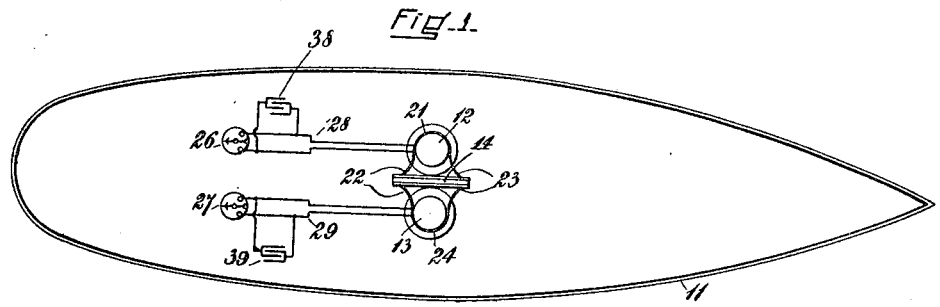
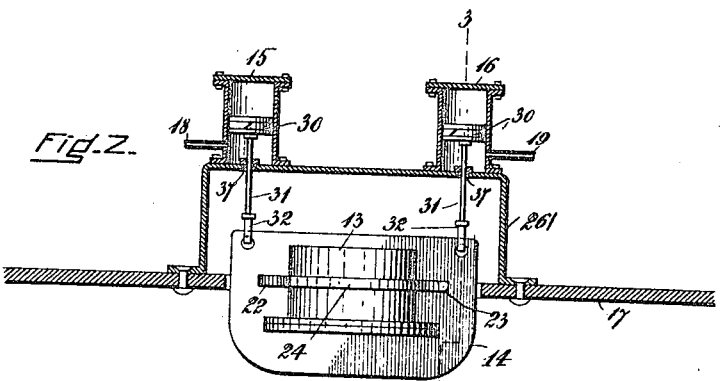
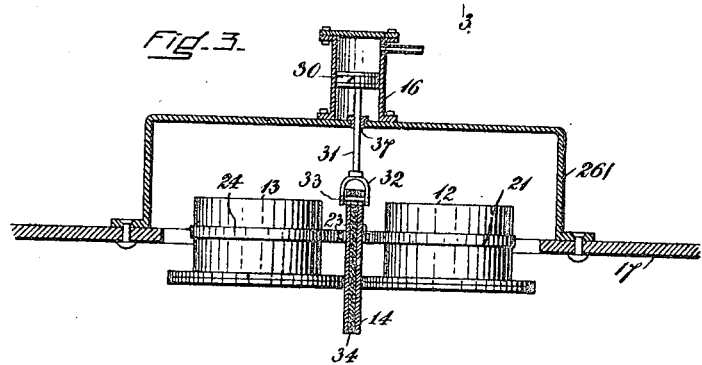
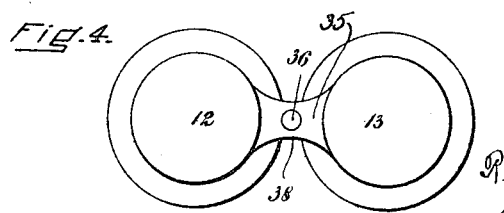
INVENTOR:
Reginald A. Fessenden.
BY
HIS ATTORNEYS

UNITED STATES PATENT OFFICE.

REGINALD A. FESSENDEN, OF BROOKLINE, MASSACHUSETTS, ASSIGNOR TO SUBMARINE SIGNAL COMPANY, OF PORTLAND, MAINE, A CORPORATION OF MAINE.

SUBMARINE SIGNALING.

1,394,482. Specification of Letters Patent. Patented Oct. 18, 1921.

Application filed March 29, 1917. Serial No. 158,457.

*To all whom it may concern:*

Be it known that I, REGINALD A. FESSENDEN, of Brookline, in the county of Norfolk and State of Massachusetts, a citizen of the United States, have invented a new and useful Improvement in Submarine Signaling, of which the following is a specification.

My invention relates to the generation and reception of signals, and more especially to the generation and reception of submarine signals, and still more particularly to the determination of the presence and direction of vessels and other marine bodies, and submarine signal stations.

In the accompanying drawings forming a part of this specification, Figure 1 is a diagrammatic plan showing the installation on a ship of apparatus embodying my invention.

Fig. 2 is a section showing the preferred form of mounting two oscillators for this purpose.

Fig. 3 is a section on line 3—3 of Fig. 2, and

Fig. 4 is a plan showing another way of mounting the oscillators.

The object of my invention is to obtain increased efficiency in submarine signaling and to enable the direction and position of signaling stations to be located more efficiently and to enable the presence, direction and location of submarines to be determined.

Heretofore it has been attempted to detect a submarine by listening to the sounds made by the commutator of the motor driving it and to similar noises of audible frequencies.

I have discovered that submarines progressing through the water vibrate as a whole, like a vibrating bridge girder, and emit waves whose quarter wave length is comparable with the length of the boat, and that these waves are emitted with great intensity, and that their frequency is of the order of one second, or thereabout.

I have discovered also that similar low frequency waves are emitted by the screw propeller, as each blade comes out from behind the stern of the boat, setting up longitudinal and lateral vibrations.

I utilize these intense low frequency vibrations discovered by me to detect the presence of submarine and other vessels, by receiving them on an electro-magnetic mechanism and transforming the energy of these low frequency and inaudible vibrations into observable signals by means of apparatus of the character described later in this specification.

I determine the direction and other information related to the submarines and other vessels by using a plurality of electro-magnetic receiving mechanisms and determining the phase difference in the time of arrival of these low frequency impulses at the different electro-magnetic mechanisms, and also by shielding one or more of the electromagnetic mechanisms from the influence of these low frequency vibrations to a greater extent than the other electro-magnetic mechanisms.

In Fig. 1, 11 is the plan view of the vessel; 12 and 13 are two oscillators placed in a recess in the bottom of the ship, as shown in Fig. 2, and attached to a sound screen 14. The oscillator which I prefer to use is that described in my United States Letters Patent No. 1,167,366.

28 and 29 are conductors from the oscillators 12 and 13, connecting them to the quartz fiber galvanometers 26 and 27.

As shown, each oscillator is attached by means of a strap 21, 24, to the sound screen 14 at the points 22 and 23. 17 is the bottom of the ship, and 261 is the wall of the recess for containing the oscillator.

30 and 31 are pistons and piston rods attached at the lower end to the sound screen 14 by a yoke 32 and hinge pin 33 and at the upper end moving in the hydraulic cylinders 15 and 16. 18 and 19 are pipes for operating these hydraulic cylinders and on fluid being pumped in through 18 and 19 into the cylinders, the pistons 30 and 30 are raised, thus lifting up the sound screen 14 and the oscillators 12 and 13.

On the liquid being released through the pipes 18 and 19 the oscillators and sound screen are lowered.

If the liquid is released from only one cylinder, that end of the sound screen will be lowered and the oscillators will be tilted so as to face forward or backward according to which cylinder the liquid was released from.

The sound screen 14 is preferably made out of metal plates with a space 34 between them, which space may be filled if desired, with some sound-insulating medium, such as asbestos fiber.

In the operation of my invention, the apparatus being installed as shown, if signals are received from either side of the vessel the sound screen 14 will shield the oscillator on the side away from the source of sound. If the oscillator 12 is on the side next to the source of sound, the indication on the indicating mechanism 26 will be stronger than that on the indicating mechanism 27, thus determining the side the sound came from.

In order to determine the exact direction of the sound, the ship may be turned toward the direction of the sound until the intensities of the indications on 26 and 27 are equal, in the well known manner used with microphones.

In order to determine whether the source of sound is ahead or astern the oscillators may be tilted so as to slant forward or backward by means of the hydraulic cylinders 15 and 16, and noting which direction of tilting increases the strength of the received signals.

In place of noting equal intensities, I may determine the direction of the sound by noting the difference in the phase angle or time of arrival of the signal at the two oscillators. For example, if the filament of the quartz fiber galvanometer 26 moves in advance of the galvanometer 27 then the source of the sound is on the same side of the ship as the oscillator 12 and by changing the phase in the well known manner, or by turning the vessel until the signals arrive at the oscillators 12 and 13 simultaneously and the indications on the galvanometers 26 and 27 are synchronous and in phase, it will then be known that the vessel is pointing directly at the source of the signals.

In place of turning the whole vessel, as above described, the two oscillators 12 and 13 may be connected by a brace 35 through which passes a rod 36, as shown diagrammatically in Fig. 4, and rotated about this rod as an axis until the signals are received synchronously on both oscillators, when the source of sound will be in a direction perpendicular to the line joining the centers of the oscillators.

The oscillators, as shown, are preferably not in contact with the vessel but only with the sound screen 14.

This arrangement possesses the advantage that noises generated inside the ship from moving machinery, etc., are not transmitted to any great extent to the oscillators since such sounds have to travel down the rods 31 and these rods are preferably attached through a bushing, as shown in Fig. 3, of material which conducts sound poorly, such as rubber.

Another advantage of so mounting the oscillators in proximity to each other is that both are subject to the same type of water noises (most of which, being high frequency, are cut out by the condensers 38, 39, connected across the galvanometers 26, 27, Fig. 1), and consequently by connecting the two oscillators in series and in opposition to each other and in series with one of the galvanometers the water noises will be to a considerable extent eliminated and an indication received on either oscillator will give an indication substantially unchanged in strength because the other oscillator is shadowed by the shield 14.

In place of using indicating instruments 26, 27, directly connected to the oscillators 12, 13, an amplifier such as an audion or pliotron may be used to amplify the signals, and the amplified electric currents and voltages used to produce an indication of larger intensity or of greater frequency, as disclosed in United States Patent No. 1,212,202. Other arrangements of apparatus embodying my invention as disclosed in the claims will occur to those skilled in the art.

What I claim as my invention is:—

1. Means for locating the direction of submarine sounds, comprising a plurality of submarine sound detectors, means for acoustically insulating each one of said detectors from the other detector, and means for rotating into and maintaining in any desired position the sound screen acoustically-insulating means, whereby the intensity of the received signals is caused to vary and indicate the direction from which the sounds are received.

2. Means for locating the direction of submarine sounds, comprising a plurality of submarine sound detectors, means for acoustically insulating each one of said detectors from the other detectors, means for rigidly connecting together said receivers and said acoustically insulating means, and means for rotating into and maintaining in any desired position said detectors, said acoustically insulating means, and said rigid connecting means.

3. Means for locating the direction of submarine sounds, comprising two submarine sound detectors, a flat acoustically insulating sound screen located between said detectors, means for connecting together said detectors and said sound screen, and means for rotating said detectors, sound screen, and connecting means, whereby the strength of received sounds may be varied by turning said detectors, sound screen, and connecting means.

4. Means for locating the direction of submarine sounds comprising two submarine sound detectors, a sound screen located between said detectors, means for connecting together said detectors and sound screen, means for rotating said detectors, sound screen and connecting means, and means for moving vertically said detectors, sound screen and connecting means.

5. The method of determining the direction of a sound source which consists in receiving the sound emitted from the sound source on two sound receivers located at a distance from each other and determining the phase difference of the sound received by said receivers, said receivers being connected in opposition to each other whereby disturbing noises may be substantially eliminated and the sound desired to be received will not be eliminated.

REGINALD A. FESSENDEN.